Dec. 14, 1926.  
R. L. McILVAINE  
1,610,563  
APPARATUS FOR ASCERTAINING MOISTURE  
Filed April 19, 1926
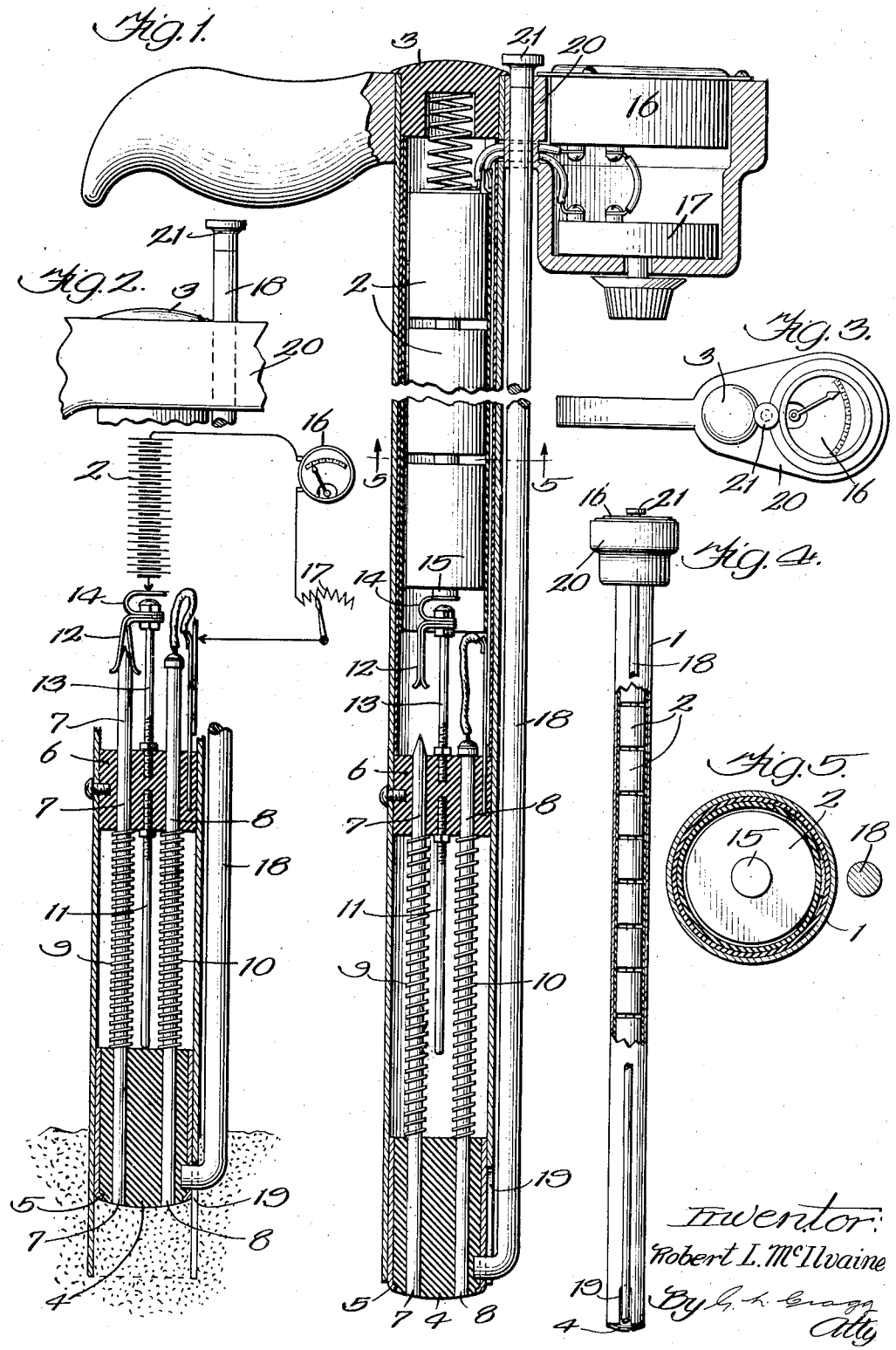

Patented Dec. 14, 1926.

1,610,563

UNITED STATES PATENT OFFICE.

ROBERT L. McILVAINE, OF CHICAGO, ILLINOIS.

APPARATUS FOR ASCERTAINING MOISTURE.

Application filed April 19, 1926. Serial No. 103,176.

My invention relates to apparatus for determining the moisture content of masses of particles, such as molding sand.

The moisture content of molding sand should be carefully predetermined to suit the sand to the nature of the casting metal or alloy employed in producing castings. It was customary, hitherto, to weigh the wet sand, dry the sand after weighing and weighing the dried sand, the difference in the weights of the sand before and after drying defining the moisture content. This and other prior methods are tedious and non-expeditious and not commercially desirable.

In accordance with one feature of my invention, I employ a hollow plunger open at its entering end for receiving a mass of particles whose moisture content is to be determined, an electric current conducting circuit portion having a terminal part spaced inwardly apart from the entering end of said plunger, and a source of current and an indicating instrument in said circuit portion. In the preferred embodiment of the invention, the terminal part of the indicating instrument circuit portion is in the form of two terminals and these terminals are carried by a plunger of insulation which is telescopically received in the hollow plunger that constitutes a carrier for the second plunger, to enable the entering end of the second plunger either to be substantially clear of the first plunger or to be withdrawn into the first plunger to be spaced apart from the entering end thereof to afford the desired receiving space for a portion of the mass of particles whose moisture content is to be determined. The terminals carried by the insulating plunger are desirably flush with the entering end of this plunger and this entering end is desirably convex, whereby no portion of the mass being tested is lodged or pocketed between the terminals as the instrument is being inserted to the desired level or position. Spring means are employed for pressing outwardly upon the second plunger and the circuit terminal part carried thereby for the purpose of compacting the particles trapped within the first plunger to a predetermined density so that there will be but one variable factor in the testing circuit, namely, the degree of moisture in the mass of particles that bridges the terminals. The particles which are nearer the surface may be somewhat drier than the bulk of the mass, making it inadvisable to employ this part of the mass in testing, the entering end of the instrument being preferably inserted to a depth where the moisture content is the average moisture content of the mass. In order that none of the particles may be received in the hollow plunger of the instrument until the instrument has been inserted to the desired depth or position, I provide manually controlled means for holding the second plunger with its entering end substantially clear of the hollow plunger, the second plunger being released when the instrument has been inserted nearly to the desired depth, further movement of the instrument into the mass then pressing upon the second plunger to move it into the first plunger against the force of the spring means whereby a selected mass of the sand or other particles is trapped within the hollow plunger below the second plunger, the spring means exerting the desired pressure upon the trapped sand where the sand bridges the terminals of the testing circuit, for the purpose set forth. When the second plunger has been moved sufficiently inwardly against the force of the spring means, the testing circuit is closed preferably by means of a switch which is operated by the second plunger when brought to its innermost position.

I will explain my invention more fully by reference to the accompanying drawing in which Fig. 1 is a sectional elevation of the preferred embodiment thereof; Fig. 2 is a view diagrammatically illustrating the circuit arrangement of the device; Fig. 3 is a plan view, on a smaller scale; Fig. 4 is a side view, on a smaller scale, parts being broken away; and Fig. 5 is a sectional view on line 5—5 of Fig. 1.

The instrument includes a long hollow cylindrical carrier or plunger 1 containing a number of battery cells 2 arranged in series and furnishing suitable electrical pressure, say twenty volts. The ends of the hollow plunger are closed by insulating plugs 3 and 4 respectively at the top and bottom ends of the plunger. The plug 3 is fixed and the plug 4 is telescopically received in the plunger 1 and constitutes a second plunger. The plunger 4 is desirably provided with a metallic sheath 5 which has sliding fit with and within the hollow plunger 1 which is also preferably metal. An insulating plug 6 is fixed within the hollow plunger 1 at a suitable distance above the second plunger 4. This plug is provided with two parallel openings formed therethrough longitudinally of the instrument and in which metallic rods 7 and 8 are adapted to slide. These rods constitute terminals of the testing circuit that is to be hereinafter more fully described and are fixed at their lower or outer ends within the second plunger 4, these rods terminating flush with the convex entering end of the plunger carrying them. Coiled springs 9, 10 surround the rods and abut the plug 6 at their inner ends and the plunger 4 at their outer ends, these springs pressing outwardly upon the plunger 4 sufficiently to compact the selected portion of the tested mass to the desired predetermined extent so that the variable factor in the testing circuit is the amount of moisture in the mass of sand or other particles that bridges said terminals. This pressure is not fully or finally exerted until the plunger 4 has been moved into the plunger 1 to a predetermined extent. The mass of particles undergoing test being trapped in the entering end of the plunger 1 and placed under the desired degree of compactness before the testing circuit is closed. The extent to which the plunger 4 may be moved into the plunger 1 is desirably determined by an abutment post 11 carried by the plug 6 and downwardly extending therefrom to the desired extent, for the purpose stated. When the plunger 4 has been moved sufficiently inwardly against the force of the springs 9 and 10 and as a consequence of the pressure thereof upon the mass, the testing circuit is closed. The closure of the testing circuit is desirably automatically effected by constituting the metal rod 7 one contacting member of a switch serially included in the testing circuit and engageable with the complemental switch contact 12 when the plunger 4 has about reached the inner limit of its motion. The switch contact 12 is desirably carried upon a metallic rod 13 which also desirably carries a contact 14 which supports the series of battery cells and engages the terminal 15 of the lowermost cell. The rod 13 is carried by plug 6. The testing circuit also includes an ammeter 16 and a rheostat whose resistance 17 is desirably very high, say fifty thousand ohms, when the instrument is employed for measuring the moisture content of molding sand. When the portion of the testing circuit which permanently pertains to the instrument is closed at the switch 7—12, the testing circuit, as a whole, is closed by the mass of particles in bridging contact with the terminal part 7, 8 of the aforesaid circuit portion, the moisture content of the mass portion that bridges the terminal 7, 8 determining the amount of current flowing through the circuit, the testing instrument 16 indicating the current flow. The instrument 16 may be callibrated to furnish readings corresponding to the different moisture contents. I desirably employ sufficiently high resistance, at 17, in the testing circuit, to prevent or sufficiently reduce the electrolytic action between the moist particles and the metallic terminals 7 and 8, for if electrolytic action were permitted to occur to a material extent, bubbles would arise at said terminal which would give rise to a resistance increasing factor in the path of the current which would cause the instrument to indicate a higher resistance and therefore a drier condition of the mass than is the case.

Where the instrument is to be inserted into the mass to a material extent in order to reach deeper portions thereof, I provide means for preventing the plunger 4 from being moved into the plunger 1 until the entering end of the instrument has about reached the desired position therefor whereon movement of the plunger 4 into the plunger 1 is permitted, for the purpose and with the results stated. To this end I desirably employ a rod 18 connected at one end with the plunger 4 and movable at this end in a slot 19 formed in the side of the plunger 1. This rod extends along the plunger 1 and slides through an opening in the bracket 20 which carries the instrument 16 and the rheostat 17 at the upper end of the instrument. The rod 18 is provided with a button 21 at its top end which is pressed upon by the thumb of the user to hold the plunger 4 in its outer position with the entering end thereof substantially clear of the plunger 1 until the instrument has been inserted into the mass to the desired extent whereupon said button is released to permit the plunger 4 to be moved into the plunger 1 upon further movement of the instrument.

The hollow plunger 1 constitutes the preferred form of carrier for the solid plunger 4, as the device is illustrated, though the invention is not to be limited to the hollow formation of such carrier.

Changes may be made without departing from the invention.

Having thus described my invention, I claim:

1. Apparatus for the purpose specified including a plunger in the form of a sleeve; a second plunger telescopically received in the plunger sleeve to enable the entering end of the second plunger either to be substantially clear of the sleeve or to be moved into the sleeve to be spaced apart from the entering end of the sleeve to afford a receiving space in the sleeve beyond the second plunger for receiving a mass of particles; an electric current conducting circuit portion have a terminal part carried by the second plunger and flush with the entering end of this plunger, this plunger end being convex; and a source of current and an indicating instrument in said circuit portion.

2. Apparatus for the purpose specified including a plunger in the form of a sleeve; a second plunger telescopically received in the plunger sleeve to enable the entering end of the second plunger either to be substantially clear of the sleeve or to be moved into the sleeve to be spaced apart from the entering end of the sleeve to afford a receiving space in the sleeve beyond the second plunger for receiving a mass of particles; an electric current conducting circuit portion having a terminal part carried by the second plunger and flush with the entering end of this plunger; and a source of current and an indicating instrument in said circuit portion.

3. Apparatus for the purpose specified including a plunger in the form of a sleeve; a second plunger telescopically received in the plunger sleeve to enable the entering end of the second plunger either to be substantially clear of the sleeve or to be moved into the sleeve to be spaced apart from the entering end of the sleeve to afford a receiving space in the sleeve beyond the second plunger for receiving a mass of particles; an electric current conducting circuit portion having a terminal part carried by the second plunger; spring means pressing outwardly upon the second plunger; means for preventing inward movement of the second plunger; and a source of current and an indicating instrument in said circuit portion.

4. Apparatus for the purpose specified including a plunger in the form of a sleeve; a second plunger telescopically received in the plunger sleeve to enable the entering end of the second plunger either to be substantially clear of the sleeve or to be moved into the sleeve to be spaced apart from the entering end of the sleeve to afford a receiving space in the sleeve beyond the second plunger for receiving a mass of particles; an electric current conducting circuit portion having a terminal part carried by the second plunger; means for holding the second plunger in its outer position; and a source of current and an indicating instrument in said circuit portion.

5. Apparatus for the purpose specified including a plunger in the form of a sleeve; a second plunger telescopically received in the plunger sleeve to enable the entering end of the second plunger either to be substantially clear of the sleeve or to be moved into the sleeve to be spaced apart from the entering end of the sleeve to afford a receiving space in the sleeve beyond the second plunger for receiving a mass of particles; an electric current conducting circuit portion having a terminal part carried by the second plunger; spring means pressing outwardly upon the second plunger; and a source of current and an indicating instrument in said circuit portion.

6. Apparatus for the purpose specified including a plunger in the form of a sleeve; a second plunger telescopically received in the plunger sleeve to enable the entering end of the second plunger either to be substantially clear of the sleeve or to be moved into the sleeve to be spaced apart from the entering end of the sleeve to afford a receiving space in the sleeve beyond the second plunger for receiving a mass of particles; an electric current conducting circuit portion having a terminal part upon the second plunger; and a source of current and an indicating instrument in said circuit portion.

7. Apparatus for the purpose specified including a plunger in the form of a sleeve; a second plunger received in and movable along and within the plunger sleeve; an electric current conducting circuit portion having a terminal part upon the second plunger; and a source of current and an indicating instrument in said circuit portion.

8. Apparatus for the purpose specified including a plunger in the form of a sleeve; a second plunger received in and movable along and within the plunger sleeve; an electric current conducting circuit portion having a terminal part upon the second plunger; spring means pressing outwardly upon the second plunger; and a source of current and an indicating instrument in said circuit portion.

9. Apparatus for the purpose specified including a plunger in the form of a sleeve; a second plunger received in and movable along and within the plunger sleeve; an electric current conducting circuit portion having a terminal part upon the second plunger; spring means pressing outwardly upon the second plunger; means preventing the movement of the second plunger inwardly; and a source of current and an indicating instrument in said circuit portion.

10. Apparatus for the purpose specified including a hollow plunger open at its entering end for receiving a mass of particles; an electric current conducting circuit portion having a terminal part spaced inwardly apart from the entering end of said plunger and movable along the plunger; spring means pressing outwardly upon said terminal part; and a source of current and an indicating instrument in said circuit portion.

11. Apparatus for the purpose specified including a hollow plunger open at its entering end for receiving a mass of particles; an electric current conducting circuit portion having a terminal part spaced inwardly apart from the entering end of said plunger and movable along the plunger; spring means pressing outwardly upon said terminal part; means preventing the inward movement of said terminal part; and a source of current and an indicating instrument in said circuit portion.

12. Apparatus for the purpose specified including a plunger in the form of a sleeve; a second plunger received in and movable along and within the plunger sleeve; an electric current conducting circuit portion having a terminal part upon the second plunger; a source of current and an indicating instrument in said circuit portion; and a switch in said testing circuit portion operable by the second plunger in being inwardly moved.

13. Apparatus for the purpose specified including a plunger in the form of a sleeve; a second plunger received in and movable along and within the plunger sleeve; an electric current conducting circuit portion having a terminal part upon the second plunger; spring means pressing outwardly upon the second plunger; a source of current and an indicating instrument in said circuit portion; and a switch in said testing circuit portion operable by the second plunger in being inwardly moved.

14. Apparatus for the purpose specified including a plunger in the form of a sleeve; a second plunger received in and movable along and within the plunger sleeve; an electric current conducting circuit portion having a terminal part upon the second plunger; spring means pressing outwardly upon the second plunger; means preventing the movement of the second plunger inwardly; a source of current and an indicating instrument in said circuit portion; and a switch in said testing circuit portion operable by the second plunger in being inwardly moved.

15. Apparatus for the purpose specified including a plunger; a carrier for the plunger along which the plunger is movable; an electric current conducting circuit portion having a terminal part upon said plunger; spring means pressing outwardly upon said plunger: and a source of current and an indicating instrument in said circuit portion.

16. Apparatus for the purpose specified including a plunger; a carrier for the plunger along which the plunger is movable; an electric current conducting circuit portion having a terminal part upon said plunger; spring means pressing outwardly upon said plunger; a source of current and an indicating instrument in said circuit portion; and a switch in said circuit portion having complemental contacts upon said plunger and carrier.

17. Apparatus for the purpose specified including a plunger; a carrier for the plunger along which the plunger is movable; an electric current conducting circuit portion having a terminal part upon said plunger; a source of current and an indicating instrument in said circuit portion; and a switch in said circuit portion having complemental contacts upon said plunger and carrier.

In witness whereof, I hereunto subscribe my name.

ROBERT L. McILVAINE.